(12) United States Patent
Pichot

(10) Patent No.: US 8,902,553 B2
(45) Date of Patent: Dec. 2, 2014

(54) MEASURING ARRANGEMENT FOR DETERMINING A MEASURED QUANTITY

(71) Applicant: KROHNE Messtechnik GmbH, Duisburg (DE)

(72) Inventor: Vincent Pichot, Romans sur Isere (FR)

(73) Assignee: KROHNE Messtechnik GmbH, Duisburg (DE)

( * ) Notice: Subject to any disclaimer, the term of this patent is extended or adjusted under 35 U.S.C. 154(b) by 126 days.

(21) Appl. No.: 13/751,853

(22) Filed: Jan. 28, 2013

(65) Prior Publication Data

US 2014/0126097 A1   May 8, 2014

(30) Foreign Application Priority Data

Nov. 8, 2012   (DE) .......................... 10 2012 021 794

(51) Int. Cl.
*H02H 3/00* (2006.01)
*G01D 21/00* (2006.01)
*G01F 1/32* (2006.01)
*G01D 3/08* (2006.01)
*G01F 25/00* (2006.01)
*G01D 18/00* (2006.01)
*H02H 7/00* (2006.01)

(52) U.S. Cl.
CPC ................. *H02H 7/00* (2013.01); *G01D 21/00* (2013.01); *G01F 1/32* (2013.01); *G01F 1/329* (2013.01); *G01D 3/08* (2013.01); *G01F 25/0076* (2013.01); *G01F 25/0007* (2013.01); *G01F 25/00* (2013.01); *G01D 18/00* (2013.01)
USPC .......................................................... 361/87

(58) Field of Classification Search
USPC .......................................................... 361/87
See application file for complete search history.

(56) References Cited

U.S. PATENT DOCUMENTS

| 4,289,114 | A | * | 9/1981 | Zadiraka ...................... 126/587 |
| 4,603,580 | A | * | 8/1986 | Waring .......................... 73/295 |
| 5,042,298 | A | * | 8/1991 | Grein et al. ................. 73/290 V |
| 5,070,730 | A | * | 12/1991 | Edvardsson ............... 73/290 V |
| 6,125,697 | A | * | 10/2000 | Holton et al. .................. 73/309 |
| 6,452,493 | B1 | | 9/2002 | Ma et al. |
| 2012/0038345 | A1 | | 2/2012 | Poremba et al. |

FOREIGN PATENT DOCUMENTS

EP     1 091 199 A1     4/2001

* cited by examiner

*Primary Examiner* — Stephen W Jackson
(74) *Attorney, Agent, or Firm* — Roberts Mlotkowski Safran & Cole, P.C.; David S. Safran

(57) ABSTRACT

A measuring arrangement for determining at least one measured quantity with a sensor device and a transmitter device that has a control device, a switch device and a signal output setting device. The control device is connected to the signal output setting device in the case in which the switch device is in the first state. The signal output setting device generates a fault signal as an output signal when the switch device is in the second state and/or that the signal output setting device is free of a connection to the control device. The sensor device keeps the switch device in the first state when the sensor device is supplied with energy above a definable minimum value. The control device reduces the power supply of the sensor device to a definable boundary value when it recognizes the presence of a fault state.

10 Claims, 2 Drawing Sheets

MEASURING ARRANGEMENT FOR DETERMINING A MEASURED QUANTITY

BACKGROUND OF THE INVENTION

1. Field of the Invention

The invention relates to a measuring arrangement for determining at least one measured quantity with at least one sensor device and at least one transmitter device. Here, the sensor device generates at least one measurement signal and the transmitter device generates at least one output signal at least from the at least one measurement signal. The measured quantity is, for example, a flow rate, a liquid level, a pH value or the temperature of a medium.

2. Description of Related Art

In modern process automation, a plurality of measuring devices is used for determining or monitoring measured quantities in order to monitor or control processes. If the applications are especially risky or critical to safety, the measuring devices, or in general measuring arrangements, must satisfy an increased measure of safety. Formulated conversely, the measuring devices must offer a certain measure of reliability. This is described via the safety requirement stage or the safety integrity level (SIL). The risk of a malfunction must be further minimized with a higher stage.

In order to recognize malfunctions, measuring devices are provided with a functionality which makes it possible for them to monitor especially themselves or individual components.

If a fault is recognized, this is signaled, on the one hand, especially via a fault signal, and on the other, the measuring devices, especially for critical faults, change into a protected state which is designed to prevent an accident from occurring by the measuring device in conjunction with the fault state.

For the further examination, measuring devices or in general measuring arrangements are divided into at least one sensor device and one transmitter device. The sensor device based on a measurement generates a measurement signal which is processed by the transmitter device. The processing can mean, for example, that in the transmitter device calibration data are stored which make it possible to deduce from the measurement signal the measured quantity of actual interest. If for example, the measurement signal is the transit time of a microwave signal of a liquid level measuring device according to the radar principle, the level of a medium which reflects the microwave signal can be deduced via reference data. In addition or alternatively, the measurement signals are converted in the transmitter device into generally standardized data which can be communicated via field busses. The generated output signal is, for example, a 4 . . . 20 mA signal.

A measuring arrangement quite generally is to be understood both as a measuring device—an alternative designation would be: field device—and also an interconnection of separate components for a measurement.

In addition to detecting a fault, it is also important for the measuring arrangement to pass reliably into a safe state for such a fault case, i.e., especially change into a rest state or an off state.

SUMMARY OF THE INVENTION

Therefore, a primary object of the invention is to provide a measuring arrangement which passes into a secured state in case of a fault.

The measuring arrangement in accordance with the invention in which the aforementioned object is achieved is characterized, first of all, essentially in that the transmitter device has at least one control device, at least one switch device and at least one signal output setting device. The signal output setting device is made to produce at least one output signal. The switch device is made such that the switch device is at least in a first or in a second state. The control device is connected to the signal output setting device in the case in which the switch device is in the first state. The signal output setting device generates at least one fault signal as an output signal in the case in which the switch device is in the second state and/or that the signal output setting device is free of a connection to the control device. The control device also acts on the power supply of the sensor device and the sensor device acts on the switch device. The sensor device keeps the switch device in the first state in the case in which the sensor device is supplied with energy above a definable minimum value. Finally, the control device reduces at least the power supply of the sensor device to a definable boundary value in the case in which the control device recognizes the presence of a fault state. In one configuration the control device generates a fault signal as the output signal via the signal output setting device and reduces the power supply of the sensor device to a definable boundary value in the case in which it recognizes the presence of a fault state.

The measuring arrangement is divided into at least one sensor device and a transmitter device which is made for the processing, conversion, conditioning, etc. of the measurement signals of the sensor device, and which generates an output signal which, for example, is transmitted via a field bus interface as an example for an optionally configured interface to other units, or for example, a control room. In the transmitter device, there is a switch device that, in the fault-free state and in the case in which the sensor device is supplied with sufficient energy, is kept by the sensor device in a state in which there is a connection between the control device and the signal output setting device so that the control device controls the generation of the output signal hereby and conversely the control device is supplied with power.

In one configuration, especially the control device, the switch device and the signal output setting device are connected in series. In another configuration at least with reference to the power supply the sensor device is likewise located in series downstream of the control device or is arranged in general such that interruption of the power supply of the control device also leads to an interruption of the power supply of the sensor device.

If the switch device is in a state in which the connection between the control device and the signal output setting device is interrupted, on the one hand, the indicated power supply of the control device is interrupted, and on the other, the signal output setting device recognizes this and generates a fault signal as the output signal.

The switch device is kept by the sensor device in the state in which the control device has contact with the signal output setting device. Without the action of the sensor device, the switch device places itself in the state in which the contact is broken. Therefore, the case in which the power supply of the sensor device drops below a minimum value or is completely cancelled leads to the power supply of the control device also failing.

If the control device detects the presence of a fault state, in one configuration, it generates a fault signal as the output signal via the signal output setting device and acts especially on the power supply of the sensor device. In one configuration, it even interrupts the power supply of the sensor device. In another configuration, that a fault state has been detected is also transmitted from the control device to the sensor device. If the available energy decreases, the sensor device no longer acts on the switch device and the power supply of the control device is ended. Alternatively or in addition, the sensor device, to the extent the presence of a fault state has been transmitted to it from the control device as information, recognizes that its power supply is not being suitably limited or is being ended in the case in which there is possibly another fault in the control device or in its vicinity, and acts automatically therefrom by its acting in turn on the switch device.

One configuration calls for the sensor device to shift the switch device out of the first into the second state in the case in which the sensor device detects the presence of a fault state. Therefore, this fault state can also be the case in which the control device does not react correctly to a detected fault. Based on this configuration, in addition to the control device, there is still a second component of the measuring arrangement which looks out for fault states and transfers the measuring arrangement into a safe state. The sensor device and the control device each act on the switch device and the latter is switched into another state so that the power supply of the control device or the sensor device is interrupted.

The signal output setting device, in one configuration, outputs the at least one output signal via an interface. In one configuration, the interface which is used generally as a data interface is a field bus interface, and in another configuration, especially an interface for 4 . . . 20 mA signals so that the power supply of the measuring arrangement takes place via this interface. The interface can enable digital, analog or mixed data communication.

In one configuration, within the measuring arrangement the power supply of the sensor device takes place via the control device and in another configuration even especially only via the control device so that no further external power sources are available to the sensor device and the sensor device is transferred reliably into the protected state without power supply via the control device.

In one configuration, the control device is also used to receive the measurement signal or the measurement signals of the sensor device. Subsequently, the control device controls the generation of the output signal by the signal output setting device. For example, calibration data for the control device or reference data are stored for this purpose.

In one configuration, the switch device is configured such that the switch device is in a closed state as the first state or in an opened state as the second state. The switch device in this configuration is therefore essentially a switch which is either open or closed. Preferably, the switch device is in an opened state in a normal case, i.e., the switch device is generally opened and closed only by a special action on it.

In one configuration, it is provided that the control device carries out at least one fault test and the result of the at least one fault test is transferred to the sensor device. The control device in this configuration checks itself or the connection to or the communication with the periphery. The result or in another configuration the results of other fault tests or optionally self tests are transmitted by the control device to the sensor device. Thus, especially the sensor device is also configured such that it can evaluate these results and can optionally compare them to reference values and such that it reacts especially based on this examination of the results of the fault tests.

In one configuration, in the normal case in which the sensor device is supplied with at least sufficient energy (therefore above a definable minimum value), the sensor device keeps the switch device in the first state. Since the switch device enables the connection between the control device and the signal output setting device in the first state, therefore in this configuration, the power supply of the control device and the sensor device is also ensured by this behavior of the sensor device. This is accompanied by the fact that, in the case in which the sensor device is not supplied with energy or is not adequately supplied with energy, the sensor device is no longer able to keep the switch device in the first state so that the switch device passes especially into its natural state, i.e., the second state.

In one configuration ,the control device interrupts the power supply of the sensor device in the case in which it recognizes the presence of a fault state. The power supply is therefore reduced to zero.

In particular, there is a host of possibilities for embodying and developing the measuring arrangement in accordance with the invention. In this regard reference is made to the following description of exemplary embodiments in conjunction with the accompanying drawings.

DETAILED DESCRIPTION OF THE INVENTION

Figure 1:
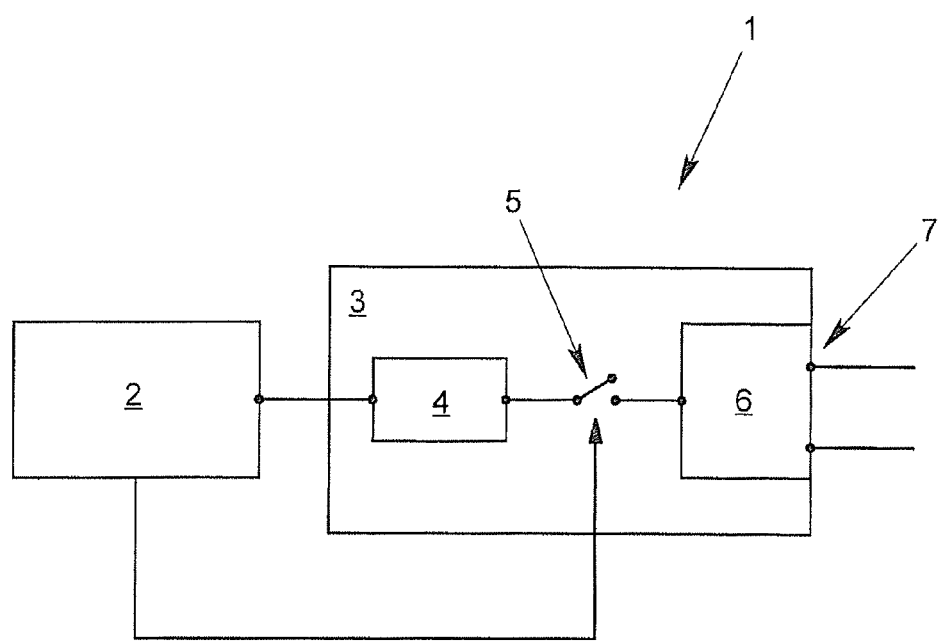
FIG. 1 is a a block diagram of a measuring arrangement in accordance with the invention which illustrates essentially the functional active relationships.
Figure 2:
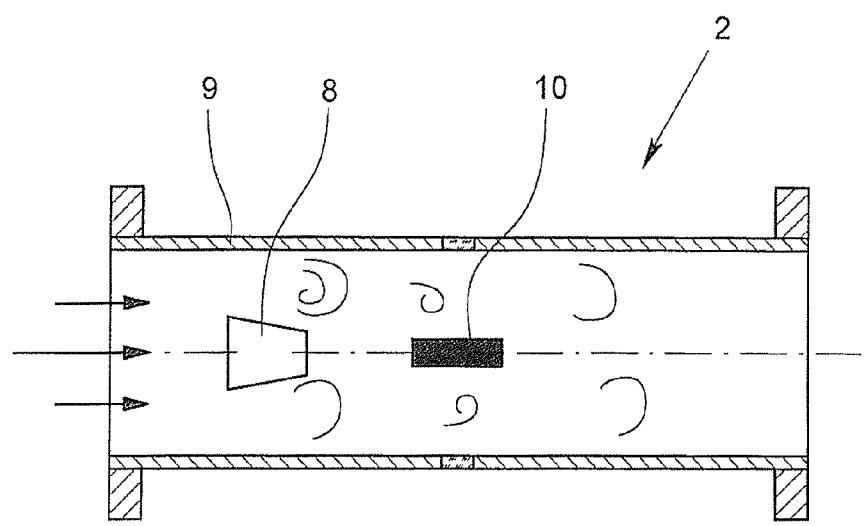
FIG. 2 is a schematic cross-sectional view of a sensor device for use in a measuring arrangement according to FIG. 1.

FIG. 1 shows an exemplary embodiment of a measuring arrangement 1, the figure not being a representation in the sense of a correct electrical wiring diagram, but rather is intended to allow the active relationships between the different components of the measuring arrangement 1 to become recognizable. FIG. 2 schematically shows an example for a sensor device 2 of the measuring arrangement 1.

In addition to the sensor device 2, the measuring arrangement 1 also has a transmitter device 3. The sensor device 2 is used for the actual measurement of the measured quantity and generates a measurement signal based on the measurement. This measurement signal is transferred to the transmitter device 3 which generates an output signal based on it. The output signal is, for example, dependent on the type of field bus or output interface via which it is communicated.

The sensor device 2 and the transmitter device 3 are shown here as independent units which are spaced part. Alternatively, the two devices 2, 3 are combined in a compact unit.

The illustrated measuring arrangement 1 is characterized especially in that, when a fault state is present, a safe state is assumed and a fault signal is reliably generated. This is implemented via the configuration of the transmitter device 3. Here, the focus is on especially safety-relevant parts or components so that, in practical implementation, there are still other components, parts, etc. which have not been shown for the sake of clarity.

The transmitter device 3 has at least one control device 4, a switch device 5 and a signal output setting device 6 which are connected in series. The control device 4 receives the measurement signal of the sensor device 2, and on this basis, controls the signal output setting device 6 so that the suitable output signal is transmitted via the field bus interface 7 as a sample configuration of the interface.

In the illustrated example, a 4 . . . 20 mA signal is output onto a two-wire line. As the output signal, a current signal is generated whose amplitude provides information about the measurement signal and especially about the associated measured value of the process variable which is to be measured within a certain range of values whose boundary values are associated with 4 mA and 20 mA. In one configuration, the fault signals are associated with a current value smaller than 3.5 mA or greater than 22 mA. An output signal with a current value smaller than 4 mA is generally interpreted as a fault signal. In another configuration, there is a digital/analog converter (not shown) downstream of one output of the control device 4.

The power supply of the transmitter device 3 or especially that of the control device 4, and in this way, indirectly that of the sensor device 2 are conversely implemented by the signal output setting device 6.

The control device 4 is connected via a switch device 5 to the signal output setting device 6. The switch device 5 can assume at least one first and a second state. For the exemplary embodiment shown in FIG. 1, the switch device 5 is closed in the first state and opened in the second state. This is associated with the fact that the control device 4 and the signal output setting device 6 are connected to one another via the switch device 5 in the first state of the switch device 5 and they are separated from one another in the second state.

For safe passage into the protected state, the switch device 5 is especially configured such that it passes into the second, i.e., the opened state, when there is no activity on it. This activity originates here especially from the sensor device 2 which actively keeps the switch device 5 in the first state, therefore closed. This leads to the fact that the switch device 5 passes into the second state, i.e., the switch is opened, in the case in which the sensor device 2 is not acting on the switch device 5.

This switch device 5 is implemented, for example, via a transistor. In addition, the sensor device 2 can also actively switch the switch device 2 back and forth between the two states. For electrical isolation in a configuration which is not shown here, the sensor device 2 is connected to the switch device 5 via an optical coupler.

If the switch device 5 is closed, therefore in the first state, the control device 4 communicates with the signal output setting device 6 and accordingly sets the output signal.

The signal output setting device 6 is configured such that it recognizes when the switch device 5 is opened, and on this basis, generates a fault signal as the output signal. In one configuration, this fault signal is equivalent to the one which the control device 4 sets when it recognizes the presence of a fault state. In an alternative configuration, the two fault signals differ in order to signal, in this way, the different causes for the generation of the fault signal.

If the control device 4 recognizes a fault state in the measuring arrangement 1 or in the process which is to be measured, it sets a fault signal as the output signal via the signal output setting device 6. Furthermore, it interrupts the power supply of the sensor device 2, as a result of which, in turn, the switch device 5 passes into the second, i.e., opened state. Depending on the elements or components used, a definable time delay between the events can be set. The opening of the switch device 5, in turn, leads to the power supply of the control device 4 being interrupted. Thus, all safety-relevant components of the measuring arrangement 1 are transferred into a rest state since the sensor device 2 and the control device 4 are cut off from the power supply. The control device 4, in one configuration, is especially also the unit which controls the transmitter device 3.

The control device 4 is especially configured such that it carries out self tests and transmits the results to the sensor device 2 such that it reads back the set output signal and likewise transfers it to the sensor device 2. From these data (a reliable test was conducted or the result is reliable or the read-back output signal agrees with the stored value, etc.) or depending on the configuration, by way of further information, the sensor device 2 is likewise able to detect whether there is a fault state. If this is the case, the sensor device 2 acts on the switch device 5 and opens it by its transferring it into the second state or optionally no longer keeping it in the first state. As addressed above, this leads to the fault signal being generated by the signal output setting device 6 and the control device 4 being separated from the power supply.

Thus, the behavior of the measuring arrangement 1, in the case of a fault, can be summarized as follows: If the control device 4 recognizes a fault state, via the signal output setting device 6, it generates a fault signal as an output signal and interrupts the power supply of the sensor device 2. In this way, the switch device 5 is no longer kept closed and the power supply of the control device 4 is interrupted. Alternatively, if the sensor device 2 recognizes a fault state, it opens the switch device 5 (directly by switching-over or indirectly by terminating the keeping of it closed), as a result of which the control device 4 and the sensor device 2 connected to it are separated from the power supply.

FIG. 2 shows a vortex flow meter for flowable media as an example of a sensor device 2. The measurement principle of vortex flow meters is based on the fact that, in a liquid or gaseous medium (indicated by the arrows), downstream of a baffle body 8 around which the medium flows in a measuring tube 9, a so-called Karman vortex street can form which is formed by the vortices which advance with the flow and which are detached from the baffle body 8. The frequency with which the vortices detach from the baffle body 8 is dependent on the flow velocity, this relationship being almost linear under certain assumptions. Therefore, the flow velocity of the medium can be determined via the measurement of the vortex frequency with a recording unit 10, as a result of which, in turn, the volumetric or mass flow rate can be determined with additional consideration of, for example, the pressure and temperature of the medium.

What is claimed is:

1. A measuring arrangement for determining at least one measured quantity, comprising:
   at least one sensor device for generating at least one measurement signal,
   at least one transmitter device for generating at least one output signal from at least the at least one measurement signal, and
   wherein the at least one transmitter device has at least one control device, at least one switch device and at least one signal output setting device,
   wherein the at least one signal output setting device is adapted for producing the at least one output signal,
   wherein the at least one switch device has a first state and a second state,
   wherein the at least one control device is connected to the at least one signal output setting device when the at least one switch device is in the first state,
   wherein the at least one signal output setting device is adapted for generating at least one fault signal as an output signal when at least one of the at least one switch device being in the second state and the at least one signal output setting device being disconnected from the at least one control device,
   wherein the at least one control device is adapted for acting on a power supply of the at least one sensor device,
   wherein the at least one sensor device is adapted for acting on the switch device, wherein the at least one sensor device is adapted for keeping the switch device in the first state when the at least one sensor device is supplied with energy above a definable minimum value, and wherein the at least one control device is adapted for reducing power supplied to the at least one sensor device to a definable boundary value when the control device recognizes the presence of a fault state.

2. The measuring arrangement in accordance with claim 1, wherein the at least one control device is adapted for generating a fault signal as the at least one output signal via the at least one signal output setting device and for reducing the power supplied to the at least one sensor device to a definable boundary value when the at least one control device recognizes the presence of a fault state.

3. The measuring arrangement in accordance with claim 1, wherein the at least one sensor device is adapted for shifting the switch device out of the first state into the second state when the at least one sensor device detects the presence of a fault state.

4. The measuring arrangement in accordance with claim 1, wherein the at least one signal output setting device is adapted for outputting the at least one output signal via an interface.

5. The measuring arrangement in accordance with claim 1, wherein power is supplied to the at least one sensor device only via the at least one control device.

6. The measuring arrangement in accordance with claim 1, wherein the at least one control device is connected so as to receive the at least one measurement signal of the sensor device and is adapted for controlling generation of the at least one output signal via the at least one signal output setting device at least based on the at least one measurement signal.

7. The measuring arrangement in accordance with claim 1, wherein the at least one switch device is configured such that the first state is a closed state and the second state is an opened state.

8. The measuring arrangement in accordance with claim 1, wherein the at least one control device is adapted for carrying out at least one fault test and for transferring at least one result of the at least one fault test to the at least one sensor device.

9. The measuring arrangement in accordance with claim 1, wherein the at least one sensor device is adapted for keeping the at least one switch device in the first state when the sensor device is supplied with energy.

10. The measuring arrangement in accordance claim 1, wherein the at least one control device is adapted for interrupting the supplying of power to the at least one sensor device when the at least one control device recognizes the presence of a fault state.

* * * * *